United States Patent [19]

Bennett et al.

[11] 4,398,806

[45] Aug. 16, 1983

[54] BROADBAND VARIABLE OPTICAL ATTENUATOR

[75] Inventors: Keith E. Bennett, Palo Alto; Robert L. Byer, Stanford, both of Calif.

[73] Assignee: The Board of Trustees of the Leland University, Palo Alto, Calif.

[21] Appl. No.: 199,845

[22] Filed: Oct. 23, 1980

[51] Int. Cl.³ .......................... G02B 5/30; G02F 1/01; B02B 27/14
[52] U.S. Cl. .................................. 350/394; 350/173; 350/395; 350/407
[58] Field of Search ............................... 350/394–395, 350/406–407, 370, 316, 402, 6.4–6.5, 6.91, 173, 286–287, 484–487; 372/16, 24, 26, 27, 31; 219/121 LA, 121 LB

[56] References Cited

U.S. PATENT DOCUMENTS 3,806,257 4/1974 Amos ................................. 350/394

FOREIGN PATENT DOCUMENTS 473144 8/1975 U.S.S.R. .............................. 350/287

OTHER PUBLICATIONS

Shurcliff, W. A., "Polarized Light", Harvard U. Press, 1962, pp. 78–84.
Evans et al., "Laser Beam Power Control Device", Jr. Sci. Instr., (Jr. of Phys. E), 1968, vol. 1, pp. 856–858.
Sporton, T. M., "Optical Transmission Through Windows Set Near the Brewster Angle", Jr. Sci. Instr., 1967, vol. 44, pp. 720–724.
Harrick, N. J., "A Continuously Variable Optical Beam Splitter & Intensity Controller", App. Optics, 11-1963, pp. 1203–1204.

Primary Examiner—William H. Punter
Attorney, Agent, or Firm—Flehr, Hohbach, Test, Albritton & Herbert

[57] ABSTRACT

An optical variable attenuator includes first, second, third and fourth wedge shaped plates, each of said plates having two surfaces defined by an angle of convergence, the first and second plates being supported with two of said surfaces of said first and second plates being in spaced parallel alignment and with the angle of convergence of the two plates being in opposite directions, and the third and fourth plates being supported with two of said surfaces of said third and fourth plates being in spaced parallel alignment and with the angle of convergence of the third and fourth plates.

6 Claims, 7 Drawing Figures

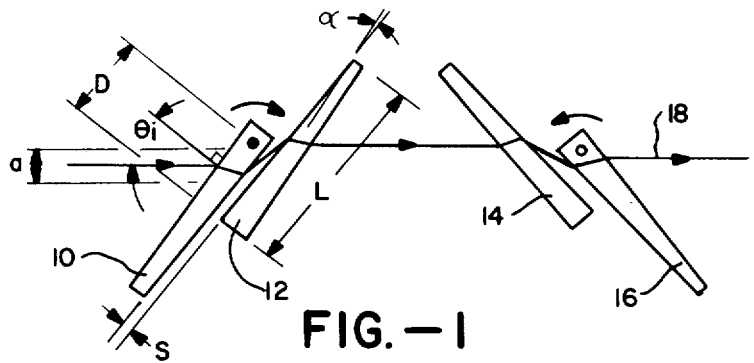
FIG.—1
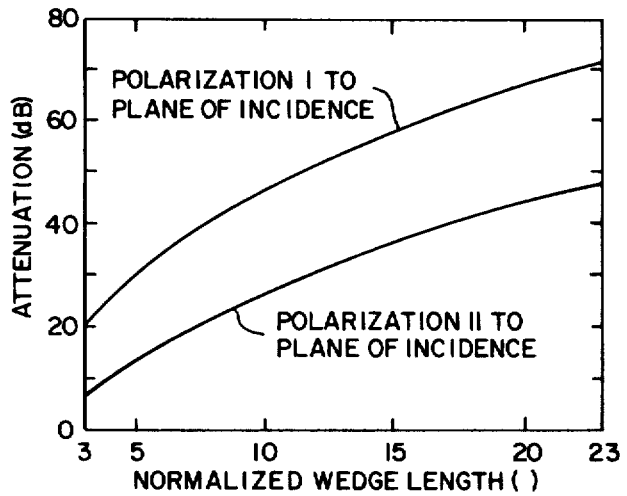
FIG.—2
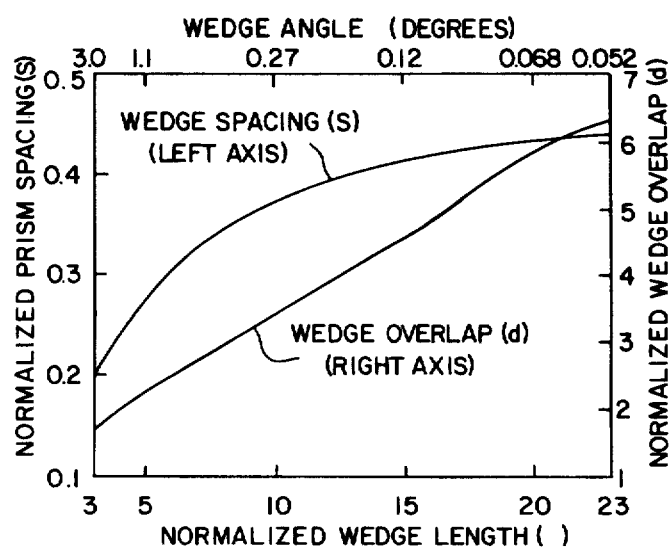
FIG.—3

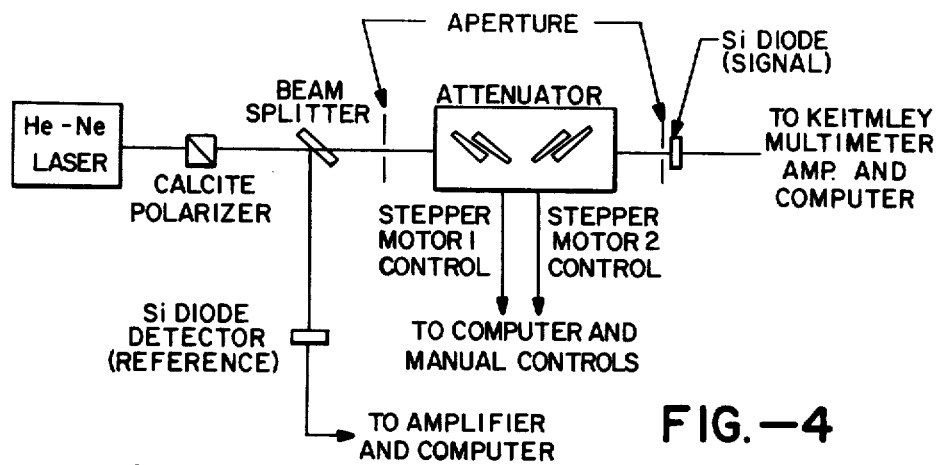
FIG.—4
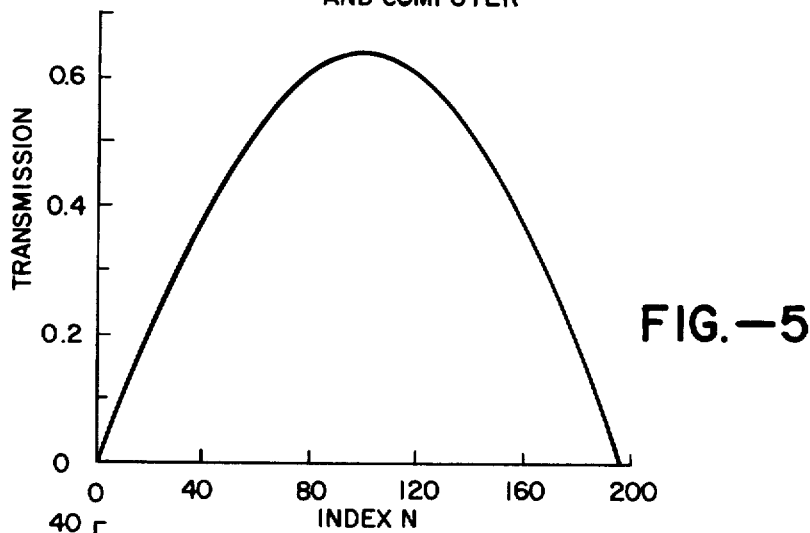
FIG.—5
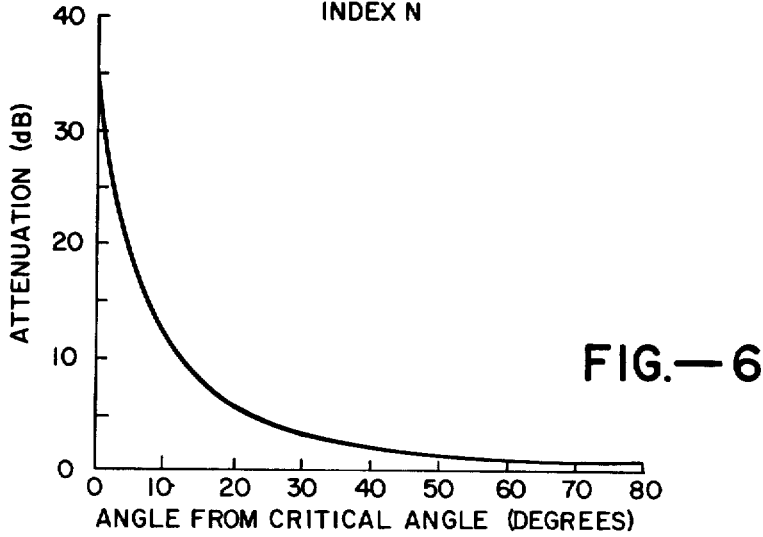
FIG.—6

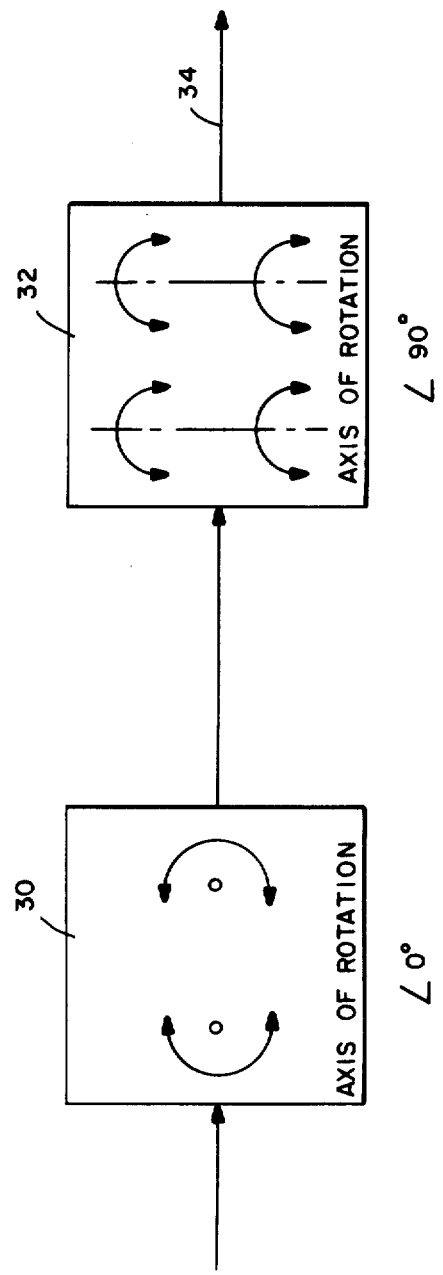
FIG.—7

BROADBAND VARIABLE OPTICAL ATTENUATOR

The U.S. Government has rights in this invention pursuant to U.S. Air Force Contract No. AF 49620-77-C-0092.

This invention relates generally to optical attenuators, and more particularly the invention relates to an optical attenuator having a wide dynamic range and suitable for use with high peak and average power laser sources.

An ideal optical variable attenuator should provide wide dynamic range, wide spectral range, resettability and high accuracy yet exhibit a simple optical and mechanical design. Heretofore, a variable optical attenuator meeting all of these requirements has not been available.

Accordingly, an object of the present invention is an improved optical variable attenuator having the aforementioned characteristics.

Briefly, in accordance with the invention an optical variable attenuator comprises first and second wedge shaped plates with each of the plates having two surfaces defined by an angle of convergence. Mechanical means supports the two plates with two of the surfaces of the plates in spaced parallel alignment and with the angle of convergence of the two plates being in opposite directions. Means is provided for rotatably positioning the two plates in an optical path whereby the optical attenuation of the two plates is varied by rotating the plates in the optical path.

Preferably, third and fourth wedge shaped plates are provided in cooperation with the first and second plates whereby the entry optical path is in alignment with the exit optical path. The third and fourth plates have the same angle of convergence as the first and second plates with means for supporting the third and fourth plates similar to the first and second plates. The third and fourth plates cooperatively rotate with the first and second plates whereby the incident optical path and the exit optical path are aligned.

The invention and objects and features thereof will be more readily apparent from the following detailed description and appended claims when taken with the drawing, in which:

FIG. 1 is a schematic of one embodiment of an optical variable attenuator in accordance with the invention.

FIG. 2 is a plot of attenuation versus normalized wedge length.

FIG. 3 is a plot of normalized wedge spacing versus normalized wedge length.

FIG. 4 is a schematic of an optical and electrical system for verifying the attenuator in accordance with the invention.

FIG. 5 is a plot of measured tranmittance versus stepper motor index.

FIG. 6 is a plot of attenuation versus angle from critical angle.

FIG. 7 is a functional block diagram of an optical variable attenuator in accordance with another embodiment of the invention.

An optical variable attenuator in accordance with the invention includes a variable incident angle wedge shaped plate which utilizes Fresnel reflection near the critical angle in a homogeneous dielectric medium. The power transmittance ($T_S$) for a single surface depends upon the polarization, the ratio of the indices of refraction n, and the angle of incidence $\theta_i$. The transmittance for light polarized parallel and perpendicular to the plane of incidence is $$T_{S\perp}(\theta_i, n) = \frac{\sin(2\theta_i)\sin(2\theta_t)}{\sin^2(\theta_i + \theta_t)} \quad (1)$$

$$T_{S\parallel}(\theta_i, n) = \frac{T_S(\theta_i, n)}{\cos^2(\theta_i - \theta_t)} \quad (2)$$

where Snell's Law in the form $$n \sin \theta_t = \sin \theta_i \quad (3)$$

applies and $n = n_t/n_i$ is the index ratio with $n_i$ and $n_t$ the refractive indices of the incident and transmitting media.

Snell's Law leads to total internal reflection when no real solution for $\theta_t$ exists and occurs only if $n_t < n_i$ or when $n < 1$. To achieve total internal reflection the attenuator is designed to use wedged plates of wedge angle $\alpha$.

The transmittance of a single wedged plate $T_W$ is the product of the transmittance of two surfaces.

$$T_W(\theta_i, n, \alpha) = T_S(\theta_i, n) T_S(\theta_t + \alpha, 1/n) \quad (4)$$

and the transmittance of the entire attenuator T is the product of the transmittances of each of the four identical wedges $$T = [T_W(\theta_i, n, \alpha)]^4 \quad (5)$$

Defining the critical angle of incidence $\theta_i^{crit}$ for the wedged plate as the minimum value of $\theta_i$ results in total internal reflection $$\sin \theta_i^{crit} = n \sin (u - \alpha)$$

$$n \sin u = 1. \quad (6)$$

The above results are applied to the design of a wedged plate attentuator hereinbelow.

Referring now to the drawings, FIG. 1 is a schematic of one embodiment of an optical variable attenuator in accordance with the invention and includes first and second wedge shaped plates 10 and 12 and third and fourth wedge shaped plates 14 and 16. Plates 10 and 12 are rotatably supported with two surfaces of the plates being in spaced parallel alignment and with the angle of convergence of the two plates being in opposite directions. Similarly, plates 14 and 16 are rotatably supported with two surfaces of the plates being in spaced parallel alignment and with the angles of convergence being in opposite directions. The four plates are cooperatively rotatably positioned in an optical path 18 with light travelling along the line of the arrows. The wedge angle $\alpha$, wedge length L, wedge spacing S, wedge overlap D, and aperture a required to accept the beam are shown. The aperture may be removed from the problem by defining normalized coordinates $l \equiv L/a$, $s \equiv S/a$ and $d \equiv D/a$. The wedge length L must be sufficiently longer than la to account for its thickness and frabrication. In order to design the attenuator the four parameters a, l, s and d must be chosen. The primary considerations are maximum attenuation required and allowable interference. For large aperture ratios ($l \geq 15$), non-uniformity of the attenuation arising from beam divergence may be a consideration at extremely high attenutations. Insertion loss for the polarization in the plane of incidence is less than 1% for $l>4$ and $n\approx 1.5$, and is relatively independent of the wedge angle for the orthogonal polarization.

The fractional beam expansion in the plane of incidence is given by $$\frac{\Delta a}{a} \approx 2 \frac{\cos^2 \theta_i}{\cos^3 \theta_{t2}} \Delta \theta_i \quad (7)$$

where $\theta_{t2}$ is the angle between the normal to the wedge and the beam in the gap between wedges in a pair, and $\Delta \theta_i$ is the full angle of the incident laser beam divergence (radians). The beam expansion $\Delta a/a$ is less than 200 $\Delta \theta_i$ for the designs considered here and is not an important consideration.

The wedge angle is determined by l. This along with the interference requirement, determines the wedge spacing s and overlap d and hence the maximum attenuation. One design procedure is to plot the parameters vs l and determine from the attenuation plot the required normalized aperture l. The normalized aperture determines the wedge angle, length, spacing and overlap.

The wedge angle $\alpha$ is chosen so that the laser beam is entirely intercepted at the critical angle given by Eq. (6). The wedge angle is $$\alpha = u - w \quad (9a)$$

where $$\sin w = 1/n \sin (\text{arc sec } l) \quad (9b)$$

The wedge spacing s is determined from the maximum allowable interference. Interference occurs when beams multiply reflected by the parallel surfaces on either side of the gap are not offset by at least the aperture a. Assuming a uniform intensity across the aperture and zero elsewhere, the fraction I of the transmission through the aperture which is doubly reflected is $$I = r^2(\theta_{t2})[1 - 2 s \tan \theta_{t2} \cos \theta_i] \quad (10)$$

if 2 s tan $\theta_{t2}$ cos $\theta_i < 1$ and is zero, otherwise. Here $r = 1 - T_s(\theta_{t2}, n)$.

After choosing a maximum value of I for each polarization the required wedge spacing is found by numerically solving for the maximum value of s as a function of $\theta_{t2}$. For the polarization in the plan of incidence, s has a single maximum for $\theta_{t2}$ greater than Brewster's angle.

A minimum wedge overlap d is required in each wedged plate pair to avoid beam clipping by the second wedge. Shell's law and geometry yields $$d = 1/\cos \theta_i - s \tan \theta_{t2} \quad (11)$$

for the beam walk where the thickness of the optics has been neglected. This function has a single maximum in the domain of interest, and is again computed numerically using the value of s determined above.

The maximum attenuation is limited by clipping of the outside edge of the second wedge. This occurs for $$\tan \theta_{t2} \geq [(l-d)/s] \quad (12)$$

The maximum attenuation is found by applying Eq. (5) with $\theta_i$ calculated from Eqs. (8a and 8b).

FIGS. 2 and 3 are plots of attenuation versus normalized wedge length and normalized wedge spacing versus normalized wedge length, respectively. These plots have been computed assuming $n = 1.45$ and 1% maximum interference in the Brewster polarization, which implies a 3-6% maximum interference in the orthogonal polarization. The procedure is as follows:

1. Determine the desired maximum attenuation and find the required normalized aperture from FIG. 2, which was calculated according to the method of the previous section, specifically Eqs. (5, 9, 10, 11, 12). The wedge length must be la+wedge thickness+fabrication tolerance.

2. Determine the wedge angle $\alpha$ from Eq. (9). This is shown along the top axis of FIG. 3.

3. Read off the spacing and overlap requirements from FIG. 3.

Interference can be reduced by increasing the spacing. However, an increase in wedge spacing also reduces the maximum attenuation.

Using these equations and design procedure, we evaluated the attenuator performance as a function of wedge angle and index of refraction for a number of factors of interest including: attenuator dynamic range; insertion loss; beam displacement and angular deviation; and acceptance angle. One design which provided a good compromise between attenuation range and ease of optical and mechanical fabrication is described next.

Referring again to FIG. 1, four identical uncoated, fused silica wedges were fabricated with $\lambda/10$ quality surfaces and wedge angles $\alpha = 1°$. This design is not strictly according to the criteria of the above section because the attenuator was designed to work well both for 1 mm diameter, 1 mrad divergence beam, and 6 mm diameter $\frac{1}{8}$ mrad divergence beams with a 10 mm positioning aperture. The pairs of wedges were mounted on counter rotating shafts located to minimize beam displacement and optical alignment problems. The shafts were driven by independent stepper motors geared through anti-backlash worm gears to a ratio of 2400 steps per radian.

The wedges were fabricated 75 mm in length. Alignment of the wedges within a pair must be within the diffraction angle of the incident beam to avoid significant beam deflection. The wedges do induce some beam expansion in the plane of incidence. However, for incident light polarized perpendicular to the plane of incidence, beam expansion is less than 0.5 mm for a 1 mrad divergence input beam at the 38 dB attenuation level, and decreases rapidly at lower attenuations. The calculated insertion loss is 24% for a dynamic range of 35 dB in this polarization.

For a beam polarized parallel to the plane of incidence and incident at Brewster's angle, the calculated insertion loss of the attenuator is less than 0.1%. The attenuator provides 15 dB dynamic range in this polarization.

The performance of the attenuator was verified using a polarized helium-neon laser source and a wide dynamic range silicon diode detector as shown in the schematic of FIG. 4. the attenuator was controlled by a PDP11/10 minicomputer which set the stepper motors and recorded the transmitted and reference powers at one second intervals for each stepper motor position.

The attenuator was placed in the helium-neon beam path in approximate alignment. Final angular alignment of the prisms was accomplished to within one-half milliradian by manually stepping the motors to critical angle independently. This procedure provided an absolute orientation for the prisms and proved to be very repeatable.

The laser output was then blocked and the dark current measured for the signal and reference channels. These levels were used as the zero signal levels for the subsequent measurements.

To show the versatility and the dynamic range of the attenuator two driving patterns were chosen. The first is a sine attenuation curve, and the second is a scan at constant angular rate. The sine attenuation routine calculates the proper number of motor steps to generate a power transmittance function $$T_N = 0.6 \sin(N\pi/200)$$

accurate to $\pm 0.0025$. The data obtained by this routine is shown in FIG. 5 for polarization perpendicular to the plane of incidence. The theoretical curve, which is drawn as a solid line in FIG. 5, is calculated according to the actual motor setting and scaled to account for a measured 1% scatter loss. The average RMS error between the actual and calculated attenuation is $$\epsilon = \left[ \frac{(x_i^{exp} - x_i^{theory})^2}{n-1} \right]^{\frac{1}{2}} = 0.008$$

The error agrees well with the average standard deviation of the data of 0.01 and the expected average digitization uncertainty of 0.005.

FIG. 6 shows the attenuation obtained for polarization perpendicular to the plane of incidence as a function of scan angle relative to the critical angle. For the fused silica wedges used $n = 1.45$ and $\theta_1^{crit} = 79.0°$ for $\alpha = 1°$. The attenuation is plotted on a semilog scale to illustrate the wide dynamic range. To retain signal levels for accurate digitization the amplifier gain settings were used with normalization chosen for each setting to match the data points in overlapping regions. The maximum attenuation was approximately 4000:1 and the insertion loss for this polarization was 25%, which yields a dynamic range of 35 dB. The average RMS error $\epsilon$ was 7%, 1.5%, 2% and 0.7% for the greater than 30 dB, 20–30 db, 10–20 dB and less than 10 dB attention ranges. The error is larger in the 10–20 dB range because the amplified signal was smaller, which led to increased electrical noise and digitization errors. Data in the 15–20 dB range was taken at a higher amplifier gain setting and had an RMS error of 1%. All averages are within one standard deviation of the theoretical values.

In addition, all points in the greater than 30 dB range showed a transmittance in excess of the theoretical value. This is due to some residual component of the orthogonal polarization. For example an orthogonal polarization component of only one part in seven hundred accounts for the 7% extra transmittance in the greater than 30 dB range.

Similar data was taken for the Brewster polarization and a maximum attenuation of 15 dB was measured as expected. The measured insertion loss was near 1% which is significantly greater than the expected 0.1% loss. However, eight wedge surfaces provide ample opportunity for scatter losses to contribute to the attenuation.

The attenuator performance was also verified with a Q-switched Nd:YAG laser source operating at 70 mJ per pulse in a 6 mm diameter beam. Since only uncoated fused silica surfaces are employed, the attenuator should operate at incident energy densities limited only by the surface damage threshold of fused silica greater than 3 J/cm$^2$.

The optical variable attenuator in accordance with the invention is suitable for use with virtually all collimated light sources, including high power Q-switched lasers. The spectral response is extremely flat and can be accurately calculated from the refractive index. The useful spectral range is very broad limited only by the transmittance range of the wedge material. The optical fabrication and mechanical design is straightforward and the attenuator does not require dielectric or metallic coatings. Fresnel's equations and a knowledge of the wedged plate indices of refraction lead to an absolute value of attenuation with an accuracy limited by the knowledge of incident polarization. Transmittances precise to better than 2% were easily obtained. Absolute accuracy can be improved by using two attenuators in tandem with relative planes of incidence rotated by precisely 90° to eliminate polarization dependence, as shown by attenuators 30 and 32 in FIG. 7. Each of attenuators 30, 32 is identical to the attenuator of FIG. 1 and are serially positioned in the optical path 34, but with the axis of rotation of the two attenuators being offset by 90° so that light attenuation is independent of light polarization.

The attenuation has a scatter limited insertion loss for the Brewster polarization of less than 1% and a dynamic range of 15 dB. The non-Brewster polarization insertion loss is 25% with a dynamic range of 35 dB. Beam deflection and offset are limited by fabrication and optical alignment tolerances. A simple hand assembly technique resulted in negligible beam offset and deflection except at the highest attenuation levels where the measured offset is less than 0.5 mm and deviation less than 0.5 mrad at attenuations greater than 35 dB.

While the invention has been described with reference to a specific embodiment, the description is illustrative of the invention and is not to be construed as limiting the invention. Various modifications and changes may occur to those skilled in the art without departing from the true spirit and scope of the invention as defined by the appended claims.

What is claimed is:

1. An optical variable attenuator comprising first and second wedge shaped plates, each of said plates having two surfaces defined by an angle of convergence, means for rotatably supporting said two plates with two of said surfaces of said plates being in spaced parallel alignment and with the angle of convergence of said two plates being in opposite directions, and means for rotatably positioning said two plates in an optical path with the axis of rotation of said two plates being perpendicular to the axis of said optical path.

2. An optical variable attenuator as defined by claim 1 wherein said angles of convergence are equal.

3. An optical variable attenuator as defined by claim 2 and further including third and fourth wedge shaped plates, each of said third and fourth plates having two surfaces defined by an angle of convergence, means for rotatably supporting said third and fourth plates with two of said surfaces of said third and fourth plates being in spaced parallel alignment and with the angle of convergence of said third and fourth plates being in opposite directions, and means for rotatably positioning said third and fourth plates in said optical path with the axis of rotation of said third and fourth plates being perpendicular to the axis of said optical path.

4. An optical variable attenuator as defined by claim 3 wherein said angles of convergence of said third and fourth plates are equal to the angles of convergence of said first and second plates.

5. An optical variable attenuator comprising a first set of first, second, third and fourth wedge shaped plates, each of said plates having two surfaces defined by an angle of convergence, means for rotatably supporting said first and second plates with two of said surfaces of said first and second plates being in spaced parallel alignment and with the angle of convergence of said two plates being in opposite directions, means for rotatably supporting said third and fourth plates with two of said surfaces of said third and fourth plates being in spaced parallel alignment and with the angle of convergence of said third and fourth plates being in opposite directions, and means for cooperatively rotating said first and second plates and said third and fourth plates in an optical path whereby a light beam passes through said attenuator with the incidence path in alignment with the exit path, the axis of rotation being perpendicular said light beam.

6. An optical variable attenuator as defined by claim 5 and further including a second set of four wedged plates with axis of rotation rotated 90° to the axis of the first set of four wedged plates such that the attenuation is independent of incident polarization, said second set being serially positioned with said first set.

* * * * *